United States Patent Office 3,789,008
Patented Jan. 29, 1974

3,789,008
COMPOSITION FOR MAINTAINING THE
INTEGRITY OF AQUEOUS MEDIA
David W. Young, Homewood, Ill., assignor to Elco
Chemicals Inc., Peotone, Ill.
No Drawing. Filed Aug. 27, 1971, Ser. No. 175,698
Int. Cl. C02b 5/06, 3/06
U.S. Cl. 252—180     5 Claims

ABSTRACT OF THE DISCLOSURE

There are disclosed compositions for maintaining the integrity of more or less stagnant water which compositions contain an aliphatic or cycloaliphatic dicarboxylic acid, a benzoic acid, a nitroalkanol, an alkyl dimethyl 1-naphthylmethyl ammonium chloride, and an N-acyl para-aminophenol. Preferred ingredients are adipic acid, benzoic acid, tris(hydroxymethyl)nitromethane, lauryl-dimethyl 1-naphthylmethyl ammonium chloride, and N-acetyl para-aminophenol. The compositions can be made in tablet form.

The present invention relates to compositions which are useful for preserving the integrity of aqueous media and their containers over extended periods of time. In one particular aspect the invention provides compositions which are especially useful for maintaining the quality of aqueous media held in containers from which the liquid may be slowly withdrawn and replaced so that the container holds a portion of the aqueous media for a substantial period of time without the container being emptied or cleaned. Such situations are exemplified by the various commercially available humidifiers which are used in the home or in business buildings.

In one type of humidifier ordinary tap water is supplied periodically to a main reservoir and water is removed from the container by slow, continuous or intermittent withdrawal. It has been found that these humidifier reservoirs develop objectionable odors from time to time, and it is therefore highly desirable to avoid such odors, otherwise they may be carried from the humidifier and into the air in which the humidifier water is disseminated.

The foregoing difficulty could be largely avoided if the somewhat stagnant water reservoirs were entirely emptied and the containers cleaned every few days. This requirement, however, is time-consuming and is an objectionable task, and hence, few people will accept this solution as being practical. Efforts have been made therefore to develop compositions which can be easily added to the liquid in the reservoir to counteract the problem. One such composition which has been employed, but without complete satisfaction, contains benzoic acid, adipic acid and lauryldimethyl 1-naphthylmethyl ammonium chloride. Water reservoirs containing such compositions have developed undesirable odors on standing. Thus there is a need to provide compositions which avoid the development of the objectionable odors, under acidic, neutral or alkaline conditions for a period of at least several weeks. Such compositions should also be effective in combating the formation, or at least be effective in combating the deposition on solid surfaces of the reservoir, of solid scale that normally derives from the various types of waters used in homes or commercial buildings.

The present invention is directed to compositions which exhibit significant improvement towards meeting the foregoing goals. Thus these compositions effectively combat the development of objectionable odors and do not experience premature degradation in water of their essential ingredients and properties. Therefore such compositions do not lose their effectiveness at a rapid rate when placed in the reservoir water whether under acidic, neutral or alkaline conditions. These compositions perform satisfactorily in either hard or soft water and serve to reduce the deposition of scale on reservoir surfaces and may even cause a reduction in the seals deposited where the reservoir has not previously employed the compositions of this invention. Any solids formed in the reservoir under the influence of water containing the compositions of this invention, are readily removed from the reservoir and its solid surfaces and may even be removed to a significant extent by merely draining the water from the reservoir.

The foregoing advantages are obtained when employing the products of this invention without significantly decreasing the rate of water removal from humidifiers during operation, thus overall humidifier efficiency is maintained. The compositions of this invention are further advantageous in that they are relatively nontoxic, noncorrosive and harmless on contact with the skin. These compositions are storage stable and can be made in more or less colorless forms, and, therefore, they or aqueous media containing them, will not strain rugs or other surfaces with which they may come in contact.

The compositions of this invention are most advantageously made avaialable in an essentially solid form, although the compositions can be in admixture with water or other liquid media in amounts such that the resulting compositions are fluid in nature. The compositions contain several ingredients including one or more dicarboxylic acids of the formula HOOCRCOOH wherein R is a saturated aliphatic or cycloaliphatic, essentially hydrocarbon group, say of about 4 to about 10 carbon atoms, preferably 4 to 6 carbon atoms such as adipic acid or sebacic acid. Another essential ingredient of the compositions of this invention is benzoic acid or an alkyl-substituted benzoic acid, which, for instance, may bear one or more lower alkyl groups of, for example, up to about 4 carbon atoms. The benzoic acids may have the formula:

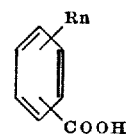

wherein R is alkyl and $n$ is 0 to 3, preferably $n$ is 0 or 1. Although these mono and dicarboxylic acids may not exhibit great solubility in water they do not have at least a slight and finite solubility in water, sufficient for my compositions to be effective in maintaining the integrity of the reservoir water.

The products of this invention also contain one or more nitroalkanols, particularly those having at least 2 hydroxyl groups such as the diols and triols. These materials are quite soluble in water and often have up to about 10 or 12 carbon atoms. Among the useful nitroalkanols are those of the formula:

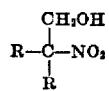

in which R is alkyl of up to 4 carbon atoms, hydroxyalkyl having up to 4 carbon atoms or hydrogen. The useful nitroalkanols include, for example, tris(hydroxymethyl) nitromethane, which is a preferred ingredient, as well as 2-nitro-1-butanol, 2-nitro-2-methyl-1-propanol, 2-nitro-2-methyl-1,3-propanediol, 2-nitro-2-ethyl-1,3-propanediol and the like.

The compositions of the present invention have as an ingredient an N-acyl para-aminophenol having the structure:

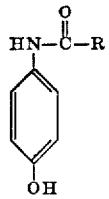

wherein R is lower alkyl, say of 1 to 4 carbon atoms. A particularly preferred component of this type is N-acetyl-para-aminophenol and other useful ingredients of this type are the corresponding materials in which R is methyl, butyl or the like. The compounds are generally soluble in water.

Another component of the compositions of this invention is a quaternary ammonium compound which is an alkyldimethyl naphthylmethyl ammonium chloride. Such materials have a small, but finite, solubility in water and are frequently available in hydrate form. The alkyl group of these compounds often as about 8–18 carbon atoms, preferably 10–14 carbon atoms, and may have a straight chained structure. Suitable quaternary ammonium compounds are described in U.S. Pat. No. 2,680,769, and include, for instance, lauryldimethyl 1-naphthylmethyl ammonium chloride monohydrate, a preferred material for use in the present invention, and similar compounds in which the alkyl group is octyl, decyl, stearyl or the like.

As stated above, some of the compounds of the compositions of the present invention have only slight solubility in water, but each component has sufficient water-solubility to impart the desirable quality to the aqueous medium. Consequently the compositions of this invention may be added in various forms to the water and are preferably added in tablet form which exhibits activity over an extended period of time. This extended action may in part be due to the fact that some of the components of the compositions have only slight solubility in water and therefore may be dissipated only at the rate they are removed from solution. The dicarboxylic acid and benzoic or monocarboxylic acid components of these compositions are usually the predominant essential ingredients in the compositions, often each of these types of acids being at least about 30 weight percent of the essential ingredients. The other essential ingredients are usually a minor portion of the total weight of these components.

The foregoing-described essential ingredients in my products can be employed in the following approximate amounts based on total weight of these ingredients:

| Ingredient | Weight percent | |
|---|---|---|
| | General | Preferred |
| Aliphatic or cycloaliphatic dicarboxylic acid | 40–60 | 45–55 |
| Benzoic or alkyl-substituted benzoic acid | 40–60 | 45–55 |
| Nitroalkanol | 0.5–5 | 1–3 |
| N-acyl para-aminophenol | 0.5–5 | 1–3 |
| Alkyldimethyl 1-naphthylmethyl ammonium chloride | 1–10 | 2–8 |

The essential ingredients may also be mixed with other components which do not significantly detract from the desired characteristics of the compositions. Such other components may be binders which facilitate the tableting of the compositions. The binders with other non-essential components often form a minor part of the total compositions. Components useful as binders include, for instance, carboxymethyl cellulose, crystalline cellulose, stearic acid and the like. It has been found convenient to use about 10 to 35, and preferably about 15 to 30, weight percent binder for use in making the composition of this invention in tablet form.

The compositions of the present invention can be added to aqueous media at various concentrations depending, for instance, on factors such as the length of time between drainings and cleaning of the reservoir and the purity of water in the reservoir. For example, a preferred composition has the following composition:

| Ingredient: | Amount, weight percent |
|---|---|
| Adipic acid | 46 |
| Benzoic acid | 46 |
| Tris(hydroxymethyl)nitromethane | 2 |
| N-acetyl para-aminophenol | 2 |
| n-Alkyl(98% $C_{12}$, 2% $C_{14}$)dimethyl 1-naphthylmethyl ammonium chlorides monohydrate | 4 |

These components can be mixed with about 25 weight percent based on the final composition, of a binder which is composed of about 85% crystalline cellulose and about 15% of stearic acid. The resulting mixture is formed into tablets weighing about 5 grams each, and in use about 4 of these tablets can be added to the water contained in a humidifier reservoir having a 15-gallon capacity. This humidifier has an absorbent pad partially immersed in the water of the reservoir. The wet pad is withdrawn from the water and contacted with a forced flow of air which is thereby humidified. During operation of this device one additional tablet of the foregoing composition is added for each 5 gallons of water removed from the reservoir. In this type of operation the humidifier operates satisfactorily for at least about 4 or 5 weeks between cleanings. Also in this operation the tablets are effective in preventing odors and deposit of scale, and do not decrease the water removal rate from the humidifier.

The foregoing described preferred composition analyzed: carbon, 54.02 weight percent, hydrogen, 6.46 weight percent, pH of solution of 5 grams in 1 gallon of tap water, 4.6, and acid value 377 (ASTM-D974). The effectiveness of this composition has also been established by tests on deionized water, with and without the addition of the tablet. In one test the deionized water was used without the tablet by supplying an initial reservoir of the water in a humidifier in contact with a flowing stream of air. Water was evaporated from the humidifier at the rate of about 1.5 to 2 gallons a day and make-up deionized water was added at this rate. The initial deionized water was odorless, but after 5 weeks of humidifier operation as described the reservoir water had a strong, sour odor. In another test similarly conducted, except that one of the above described tablets (5 grams) was added to the reservoir for each 5 gallons of water evaporated, the reservoir water at the end of 5 weeks had essentially no odor. Accordingly, the composition of this invention effectively counteracted the development of odor in the reservoir water.

It is claimed:

1. A composition useful for treating water which consists essentially of at least about 30 weight percent of dicarboxylic acid of the formula HOOCRCOOH, wherein R is a saturated aliphatic or cycloaliphatic hydrocarbon group, at least about 30 weight percent of monocarboxylic acid selected from the group consisting of benzoic acid and alkyl-substituted benzoic acids, and approximately 0.5 to 5 weight percent of water-soluble nitroalkanol, approximately 0.5 to 5 weight percent of N-acyl para-aminophenol, and approximately 1 to 10 weight percent of alkyldimethyl 1-naphthylmethyl ammonium chloride.

2. A composition of claim 1 in which the dicarboxylic acid is adipic acid, the monocarboxylic acid is benzoic acid, the nitroalkanol is tris(hydroxy-methyl)nitromethane, the N-acyl para-aminophenol is N-acetyl para-aminophenol, and the alkyldimethyl 1-naphthylmethyl ammonium chloride is lauryldimethyl 1-naphthylmethyl ammonium chloride.

3. A tabletted composition of claim 2 in which crystalline cellulose is present as a binder.

4. A composition of claim 3 having the approximate composition:

| | Percent |
|---|---|
| Adipic acid | 40 to 60 |
| Benzoic acid | 40 to 60 |
| Tris(hydroxymethyl)nitromethane | 0.5 to 5 |
| N-acetyl para-aminophenol | 0.5 to 5 |
| Lauryldimethyl 1-naphthylmethyl ammonium chloride | 1 to 10 |

5. A tabletted composition of claim 4 in which crystalline cellulose is present as a binder.

References Cited
UNITED STATES PATENTS 3,497,453   2/1970   Yurdin _____ 210—58

SAMIH N. ZAHARNA, Primary Examiner

T. G. WYSE, Assistant Examiner

U.S. Cl. X.R.

252—401; 210—58, 64; 424—317; 261—DIG. 46

UNITED STATES PATENT OFFICE
CERTIFICATE OF CORRECTION

Patent No. 3,789,008    Dated January 29, 1974

Inventor(s) DAVID W. YOUNG

It is certified that error appears in the above-identified patent and that said Letters Patent are hereby corrected as shown below:

Column 2, line 5, should be "scale" instead of "seals"

Column 2, line 49, the word "not" should be eliminated.

Signed and sealed this 19th day of November 1974.

(SEAL)
Attest:

McCOY M. GIBSON JR.    C. MARSHALL DANN
Attesting Officer      Commissioner of Patents